United States Patent [19]

Brennan

[11] 4,294,005
[45] Oct. 13, 1981

[54] METHOD OF FORMING CATHODIC ELECTRODE STRUCTURE FOR A SODIUM SULFUR CELL

[75] Inventor: Michael P. J. Brennan, Helsby, England

[73] Assignee: Chloride Silent Power Limited, London, England

[21] Appl. No.: 41,380

[22] Filed: May 23, 1979

Related U.S. Application Data

[63] Continuation-in-part of Ser. No. 861,924, Dec. 19, 1977, Pat. No. 4,176,447.

[30] Foreign Application Priority Data

| Dec. 20, 1976 | [GB] | United Kingdom | 53197/76 |
| Feb. 6, 1979 | [AU] | Australia | 43990/79 |
| Feb. 6, 1979 | [IN] | India | 87/DEL/79 |
| Feb. 6, 1979 | [ZA] | South Africa | 79/0504 |
| Feb. 13, 1979 | [EP] | European Pat. Off. | 7930214.8 |
| Feb. 13, 1979 | [JP] | Japan | 54-15371 |
| Feb. 13, 1979 | [GB] | United Kingdom | 04968/79 |

[51] Int. Cl.³ .......................................... H01M 4/04
[52] U.S. Cl. .................................. 29/623.5; 29/417; 429/104; 264/105; 264/158
[58] Field of Search .................. 29/623.5, 623.1, 417, 29/420, 420.5, 419 R, 419 G; 429/104; 264/105, 158, 293, 295, 118, 119, 339

[56] References Cited

U.S. PATENT DOCUMENTS

| 1,726,223 | 8/1929 | Grupe | 264/118 |
| 2,093,652 | 9/1937 | Widmer et al. | 264/158 |
| 2,793,427 | 5/1957 | Marvin | 29/420.5 |
| 3,017,698 | 1/1962 | Hambrecht et al. | 29/419 |
| 3,742,369 | 6/1973 | Douglass | 29/419 |
| 3,982,957 | 9/1976 | Jones et al. | 429/163 |
| 4,049,885 | 9/1977 | Mitoff | 429/104 |
| 4,052,535 | 10/1977 | Robinson et al. | 429/233 |
| 4,061,840 | 12/1977 | Jones et al. | 429/104 |
| 4,066,826 | 1/1978 | Jones et al. | 429/104 |
| 4,076,902 | 2/1978 | Senoo | 429/104 |
| 4,118,545 | 10/1978 | Jones et al. | 429/104 |
| 4,169,120 | 9/1979 | Miller | 429/104 |

FOREIGN PATENT DOCUMENTS

995222 11/1951 France .
2261627 9/1975 France .

Primary Examiner—Daniel C. Crane
Attorney, Agent, or Firm—Beveridge, DeGrandi, Kline & Lunsford

[57] ABSTRACT

For a cylindrical sodium sulphur cell, a cathode electrode structure is provided with improved electronic conductivity in the radial direction, compared with other directions, by forming a block of fibre material, e.g. graphite fibres, with the fibres aligned in one direction, slicing the block to form a sheet with fibres normal to the plane of the sheet, moulding the sheet and impregnating it with cathodic reactant in a heated mould having a plurality of ribs, to form a plurality of trapezoidal segments with the fibres normal to the planes of the parallel surfaces of the trapezoids, cooling the mould so that the impregnant is solidified and then forming the trapezoids into an annular structure. Preferably the mould is such that thin webs are left joining adjacent trapezoidal sections along parallel edges of the wider of the two parallel faces so that the webs form hinges for folding the segments into the annular assembly.

5 Claims, 5 Drawing Figures

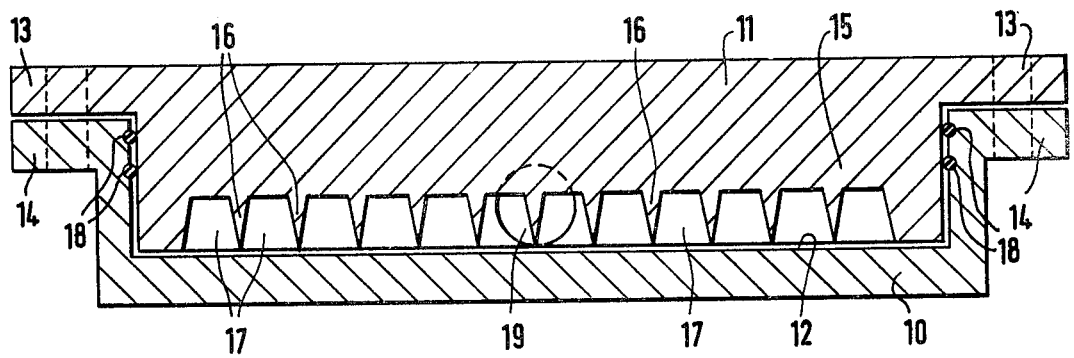
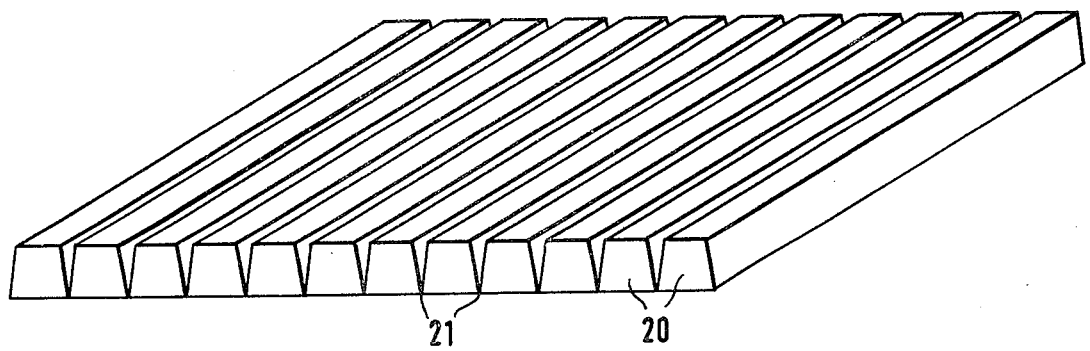
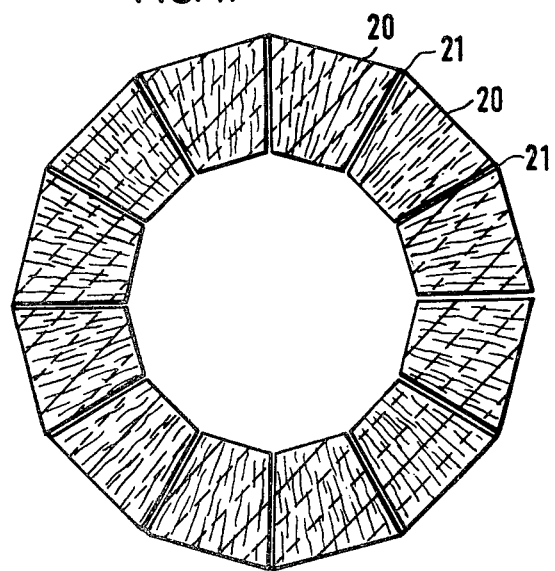

METHOD OF FORMING CATHODIC ELECTRODE STRUCTURE FOR A SODIUM SULFUR CELL

CROSS REFERENCES TO RELATED APPLICATION

This application is a continuation-in-part of co-pending application Ser. No. 861,924 filed Dec. 19, 1977, now U.S. Pat. No. 4,176,447, issued Dec. 4, 1979, entitled "Method for making an electrode".

BACKGROUND OF THE INVENTION

1. Field of the Invention

This invention relates to cathode electrode structures for sodium sulphur cells.

2. Prior Art

In a sodium sulphur cell, a solid electrolyte material separates molten sodium, forming the anode, from a sulphur/polysulphide cathodic reactant. The solid electrolyte is a material, such as beta-alumina, which conducts sodium ions. On discharge of the cell, the sodium gives up electrons at the anodic interface of the solid electrolyte. Sodium ions pass through the electrolyte into the cathode adjacent the opposite face of the electrolyte. The electrons pass through the sodium to the anode current collector and thence around an external circuit to a cathode current collector, e.g. a rod or tube formed of or coated with a material chemically inert to the cathodic reactant. The electrons must pass from this cathode current collector to the region of the cathode adjacent the surface of the solid electrolyte where they react with the sulphur to form sulphide ions. Sulphide ions and sodium ions form a polysulphide. The electronic conductivity of molten sulphur is low and hence it is the practice to pack the cathodic regions with a fibrous carbon or graphite material to provide the required electronic conductivity, the fibrous material forming a matrix through which the cathodic reactant can move.

Sodium sulphur cells are commonly of tubular form. They may be of the kind known as a central sodium cell in which the sodium is inside the electrolyte tube and the cathodic region lies between the outer surface of the electrolyte tube and a tubular current collector which might constitute or form part of the cell housing. Alternatively, the cell may be of the type known as a central sulphur cell in which the sodium is outside the electrolyte tube and the cathodic reactant is in an annular region between the inner surface of the electrolyte tube and a central current collector rod or tube. In each of these constructions, the cathodic region is of annular form. The common practice has been to use graphite felt as the electronically-conductive packing material in the cathodic region. Such felt may be formed, for example, into annular elements which may be packed axially into the cathodic region, the felt subsequently being impregnated with sulphur.

The matrix material in the cathodic region has to be porous to permit free access of the cathodic reactant material to the neighbourhood of the electrolyte. Electrically however this conductor forms the path to transfer electrons from the reaction zone to the cathode current collector when charging the cell and provides the path between the current collector and the regions near the surface of the electrolyte where the sulphide ions have to be formed on discharge of the cell.

One of the problems in sodium sulphur cells is to obtain sufficient overall conductance in the cathodic region. The conductance of the carbon matrix material in the cathodic regions constitutes one of the limitations on the performance of such cells. It is possible to increase the bulk conductance of graphite felt by packing the felt more tightly. This however impedes the free movement of the cathodic reactant material which must have access to the neighbourhood of the electrolyte. Other techniques have therefore been proposed to improve the bulk conductance in the cathodic region. For example in U.S. Pat. No. 4,052,535 there is described a cathode matrix for a sodium sulphur cell formed of a plurality of discrete elements with electronically-conductive material such as graphite foil between the elements and extending across the region between the current collector and the electrolyte to increase the conductivity across that region.

It is also known to employ loose fibres instead of felt in the cathodic region of a sodium sulphur cell, as described in U.S. Pat. No. 4,118,545. The fibre material may be packed between layers of cloth and U.S. Pat. No. 4,118,545 discloses the utilisation of the cloth to join a plurality of elongate elements, along their length, so that the assembly can be formed into an annular unit to fit within a cell. This assembly has to be impregnated with sulphur after it has been formed. That specification more particularly describes the use of a mixture of graphite or carbon fibres with fibres of another material, for example an oxide material such as alumina or zirconia, which is preferentially wetted by the sulphides in the cathodic reactant, to improve the physical transfer of the cathodic reactant material.

In U.S. Pat. No. 4,076,902 there is described a sodium sulphur cell in which graphite fibres are arranged in an annular region between a beta alumina electrolyte tube and a surrounding cell housing with the fibres in a direction normal to the cathodic current collector constituted by the cell housing and to the electrolyte tube.

In the aforementioned co-pending application, I have described a method of making an annular cathodic electrode, for a sodium sulphur cell, the electrode having a porous matrix of electronically conductive material impregnated with an electro-chemical reactant material, which method comprises the steps of shaping a sheet of compressible matrix material, and impregnating it, either before or after the shaping, with the reactant material, the shaping and impregnating being effected at a temperature above the melting point of the reactant material, cooling the impregnated shape to solidify the reactant, the shaping operation compressing the matrix material over its whole area and effecting greater compression of the material in preselected regions so that the matrix material is formed into a planar assembly of shaped segments, which are each a portion of an annulus whereby the shaped segments are formable into the required annular structure. If the compressible material is sheet material with the fibres lying generally parallel to the plane of the sheet, this results in the formation of an electrode with fibres extending parallel to the surfaces of the electrolyte and current collector.

SUMMARY OF THE INVENTION

It is an object of the present invention to provide a method of forming a cathodic electrode structure for a sodium sulphur cell which readily permits of the fibres being arranged so as to extend radially across an annular cathodic region.

According to this invention a method of forming a cathodic electrode structure for a sodium sulphur cell comprises the steps of forming a compressible block of electronically conductive fibrous material which is chemically resistant to hot sulphur/polysulphides, the fibres in the block predominantly extending in one plane, cutting the block in a plurality of planes normal to said one plane to form at least one sheet in which fibres lie normal to the plane of the sheet, compressing the sheet in a series of parallel regions to form segments of trapezoidal section between the compressed regions with fibres lying normal to the parallel surfaces of the trapezoids, impregnating the fibrous sheet, either before compression or whilst compressed, with the cathodic reactant at a temperature such that the cathodic reactant is liquid, and cooling the impregnated shape to solidify the reactant. The segments are of trapezoidal form in cross-section so that a plurality of segments may be assembled together to form an annular cathode electrode structure.

As described above, use is made of sheets in which the fibres lie predominantly in one plane. It is possible to form the fibrous material with the fibres predominantly in one direction in that plane and thus the invention includes within its scope, a method of forming a cathode electrode structure for a sodium sulphur cell comprising the steps of forming a block of electronically conductive fibrous material which is chemically resistant to a hot cathodic reactant containing sulphur/polysulphides, the fibres in the block predominantly extending in one direction, cutting the block in a plurality of planes normal to said one direction to form at least one sheet in which the fibres lie predominantly normal to the plane of the sheet, compressing the sheet in a series of parallel regions at right angles to the direction of the fibres to form segments of trapezoidal section between the compressed regions with the fibres lying predominantly normal to the parallel surfaces of the trapezoids, impregnating the fibrous sheet, either before compression or whilst compressed, with the cathodic reactant at a temperature such that the cathodic reactant is liquid, and cooling the impregnated shape to solidify the reactant.

By orienting the fibres in this way, the bulk conductance in the radial direction is enhanced compared with that which would obtain if the fibres were randomly oriented as in a felt. Individual fibres may extend completely across the cathodic region but this is not essential; shorter fibres may be used, relying on fibre-to-fibre contact.

The cathode electrode structure comprising the impregnated fibrous matrix may fill the whole of the annular region between the electrolyte and the cathode current collector but, as is well-known, it may in some cases be preferred to leave longitudinal channels or voids in the fibre structure to permit of freer movement of the cathode reactant material whilst still leaving fibres providing an electronically-conductive path completely across the region between the electrolyte and the current collector.

The cathode structure may comprise separate preforms of impregnated fibres of trapezoidal form. These may be put separately into the cell or assembled into an annular cathodic assembly before putting into the cell.

The invention thus furthermore includes within its scope an annular electrode structure having a porous matrix of electronically-conductive fibrous material with the fibres lying in generally radial directions, the matrix being impregnated with an electro-chemical reactant material which is solid at room temperature, said structure comprising a plurality of segments, each an elongate member of trapezoidal form in cross-section.

Preferably, however, the shaping is such that the material is formed into a planar assembly of shaped segments joined by thin webs, the shaped segments each being a portion of an annulus with the webs forming hinges parallel to the axis of the annulus whereby the shaped structure is foldable to form the required annular structure.

The shaping may be effected, for example, by moulding in a heated mould. In this case, the fibre material may be impregnated before or after putting it in the mould. The moulding may be effected by putting said sheet of fibre material into a ribbed mould. When the mould is cooled, the shaped structure can be removed and folded about the webs joining the segments to form the required annular shape.

The shaping is conveniently effected at a temperture such that the cathodic reactant is liquid. The material may be cooled so that the cathodic reactant sets before the segments are separated. If the fibre material is impregnated with liquid sulphur before shaping, it may be rapidly cooled to transform the sulphur to a metastable plastic shape before the shaping operation.

In making a cathode structure for a sodium sulphur cell having a sulphur-impregnated carbon or graphite fibre matrix, it has been found adequate to form the segments of trapezoidal section, i.e. having, in transverse section, two parallel sides one longer than the other, the webs being at the ends of the longer parallel side. When the shaped structure is put into a cell and raised to the operating temperature, the sulphur becomes molten and the matrix can expand slightly so as to conform to the required annular shape. Thus it is possible to use a flat sheet of matrix material and to employ a simple mould having one major surface flat and the opposite surface with a plurality of parallel V-shaped projecting ribs. The block of fibre material, before slicing into sheets, is preferably compressed normal to the direction of fibres and is maintained compressed until after it has been shaped and impregnated and subsequently cooled. Thus the trapezoidal segments can be put in a cell and will expand when the cell is raised to the working temperature.

In one convenient method, the mould is shaped to effect compression of the material in pre-selected regions arranged so that the matrix material is formed into a planar assembly of shaped segments, said reactant material is admitted in a molten state into said mould to impregnate the matrix segments and the assembly is cooled to solidify the reactant material whereby substantially rigid shaped segments of impregnated matrix material are produced, the mould being shaped to leave the segments joined together by thin webs of compressed material. Where the material is highly compressed, it will retain this state on cooling, so leaving thin webs which form hinges joining the segments.

The invention furthermore includes within its scope an annular electrode structure having a porous matrix of electronically-conductive material impregnated with an electro-chemical reactant material which is solid at room temperature and comprising a plurality of segments shaped as elongated members of trapezoidal form in cross-section, each of which segments is joined to at least one of its neighbouring segments along a longer edge of the segment, which edge is an edge defined by the end of the longer parallel side of the trapezoid in cross-section and in which the fibres extend predominantly in directions normal to said parallel sides. This structure may be used for the cathode of a sodium sulphur cell, comprising a sulphur-impregnated fibrous carbon or graphite matrix in the form of a plurality of elongated segments of trapezoidal section joined by webs and foldable to form a substantially annular structure. Such an electrode assembly may thus readily be arranged within an annular region in a cell between a cylindrical tube of solid electrolyte material and a current collector. The current collector may be located inside the electrolyte tube or outside the electrolyte tube. In either case, the matrix material will expand radially a small distance sufficient to effect electrical contact with the current collector and to be in contact with the electrolyte tube.

The matrix material may be carbon or graphite fibres or carbon or graphite felt. Such material may readily be impregnated with molten sulphur by a gravity feed or by an injection technique. It is preferable, however, to evacuate air from the mould before admitting the molten sulphur.

Although reference has been made more specifically to the impregnation of a matrix material with sulphur, for a sodium-sulphur cell, the material might be impregnated with a suitable sodium sulphide, for example $Na_2S_3$, the mould being cooled to the appropriate temperature so that the impregnant is solidified before the assembly is removed from the mould.

For impregnating, with sulphur, a matrix material in a mould, the mould may conveniently be heated to a temperature in the region of 100° C. to 400° C. and molten sulphur injected into the mould. The melting point of sulphur is 113° C. but the matrix material can be impregnated by injection of molten sulphur even if the mould temperature is slightly below the melting point of the sulphur.

A particular advantage of this technique in which an annular electrode structure is formed of a plurality of segments is that it is then readily possible to arrange electrically-conductive sheet material in the space between the segments to form conductive inserts in the electrode structure as may be desired in some cases. Such sheet material must be chemically resistant to the cathodic reactant in the cell operating conditions and might comprise for example graphite foil or a suitable metal such as a nickel-based chrome or chrome-iron alloy. It may be desired also to arrange conductive sheet material over a cylindrical face of such an assembly. If this is the inner face and if the segments are joined by webs, a single pre-shaped sheet may be utilised extending over the appropriate faces and between the segments before they are formed into the annular assembly.

There are particular advantages in having fibrous material adjacent the cathode current collector which is of higher electrical conductance than the bulk of the matrix material and for this reason a layer, e.g. a sheet of cloth of a carbon material having a better electrical conductance than the matrix fibres may be incorporated in the mould to form the surfaces of the trapezoids adjacent the current collector. This cloth may also be used to form the webs between the trapezoids. It is convenient to use a carbonised polymeric material, e.g. a polyacrylonitrile based fibre, for the cloth whilst the bulk of the matrix material may be pitch-based fibres. Such carbonised polymeric material not only improves the electrical conductance near the current collector so tending to shift the electro-chemical reaction away from that current collector towards the electrolyte but also, because it is, compared with pitch-based fibres, preferentially wetted by sulphur as against polysulphides, helps to reduce the amount of the polysulphide material adjacent the current collector and so tends to reduce corrosion.

BRIEF DESCRIPTION OF THE DRAWINGS

FIG. 2 is a cross-section through a mould for forming an electrode structure for slices from the block of FIG. 1;

FIG. 3 is a perspective view illustrating an electrode assembly before being formed into an annular structure;

FIG. 4 is a diagram illustrating the assembly of FIG. 3 arranged as an annular structure.

DESCRIPTION OF THE PREFERRED EMBODIMENTS

Figure 1:
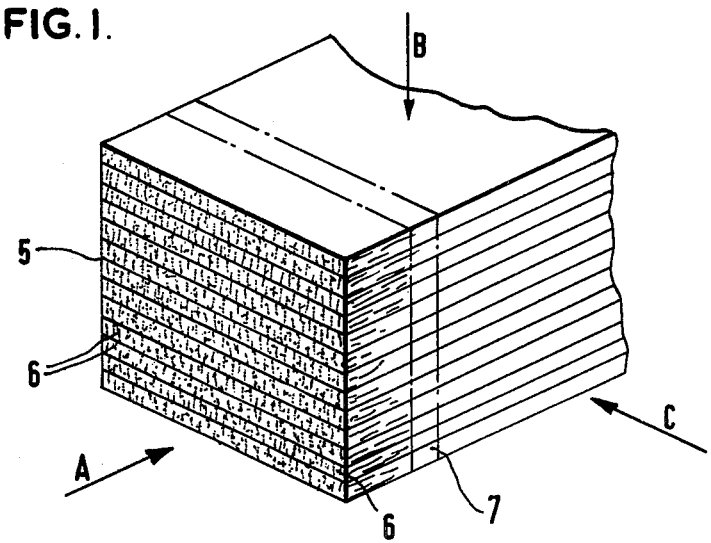
FIG. 1 illustrates a block of fibrous material prior to slicing in a process for making a cathode electrode for a sodium sulphur cell.

Referring to FIG. 1, there is shown a block 5 of fibrous material having the fibres predominantly in one plane, defined by the arrows A and C. This block is formed of carbon fibres derived from pitch in this particular embodiment. Fibrous material with coplanar fibres is commercially available in thin sheets, the fibres being parallel to the plane of the sheet. The block therefore is formed of a plurality of such sheets 6 placed one on top of another and compressed together in the direction of the arrow B. In some cases, material may be used with the fibres predominantly in one direction only, namely that indicated by the arrow A. The block may also be compressed in the direction of the arrow C; it will be noted that this compression is normal to the fibre direction if the fibres are predominantly in one direction only. The block is held in compression whilst it is sliced to give a plurality of sheets, one of which is shown at 7, the planes of the cuts being normal to the fibre direction and indicated by chain lines.

In this way it is possible to form a plurality of sheets with fibres normal to the plane of each sheet. The sheet is then maintained compressed whilst it is transferred to a mould for shaping and impregnation.

FIG. 2 shows diagrammatically in cross-section a mould for forming the cathode electrode structure for a sodium-sulphur cell. The mould comprises a female member 10 and a male member 11. The female member has a mould cavity of generally rectangular form and of uniform depth, the cavity having a flat base 12, which base is of rectangular form. The male member 11 has a flange 13 which mates with a co-operating flange 14 on the female member; securing means, e.g. bolts, are provided for securing the two flanges together. On the male member is a portion 15 generally in the form of a rectangular parallelepiped but with a plurality of ribs 16 which, when the mould is assembled, reach nearly to the flat base 12 of the female member. The spaces between the ribs 16 define elongate prism-shaped regions 17 of substantially trapezoidal cross-section. The mould is heated, for example by steam or electrical heating means (not shown) so that it can be maintained at a temperature typically between 100° and 400° C. Such heating means can comprise ducts through the metal mould structure. Seals, e.g. O-ring seals 18 around portion 15 of the male member ensures that the male and female members form a gas-tight structure.

To form an electrode structure, the aforementioned sheet of carbon fibre material, which is of uniform thickness, is put over the surface 12 of the female mould member. This thickness is substantially equal to the spacing between the parallel surfaces of the trapezoids defined by the mould. The male mould member is then secured in position and the mould is heated to a suitable temperature, typically between 100° C. and 400° C. The mould is preferably evacuated and a low pressure injection or gravity feed is provided at one end of the mould for feeding molten sulphur through an aperture 19 into a header which is constituted by making the portion 15 of the male member slightly shorter than the cavity in the female member to leave a header region within the female member at the inlet end at which the sulphur is fed into the mould. When putting the sulphur in the mould, the mould is positioned with the aperture 18 and sulphur feed reservoir at the top, the sulphur flowing in under gravity. The flow may be assisted by the evacuation of air from the mould before filling, a suitable air extraction aperture and valve being provided in the mould for this purpose. The sulphur may be fed in from a heated reservoir, which may be pressurized with argon or other suitable inert gas. The sulphur flows downwardly and impregnates the carbon or graphite felt or fibres in the mould. The mould is then cooled and opened and the resultant preform withdrawn. Instead of feeding the sulphur in to the mould via a header, as described above, it may alternatively be directly injected into the mould.

FIG. 3 illustrates this preformed electrode assembly after it has cooled and been trimmed to remove any excess matrix material and sulphur in the header region of the mould. It will be seen that this electrode assembly comprises a plurality of similar elongate segments 20 of trapezoidal section having uniformly sloping sides and joined by thin webs 21 which are very short and which extend along the lengths of the segments joining adjacent segments at the edges thereof which extend through the corners (considering the trapezoidal section) formed by the ends of the longer of the two parallel faces. Because the sulphur has set to a solid, these segments are rigid and retain their shape. The very short webs 21, being of negligible length and joined to the rigid segments, do not expand and form hinges permitting the segments to be folded into an annular structure as shown in FIG. 4. It will be seen that the angles of the sloping sides of the trapezoid have been chosen so that these sides come into close contact and lie against one another when the annular assembly is formed. This particular annular assembly is shaped for use in a tubular sodium-sulphur cell and is put into the annular region between an electrolyte tube, typically a beta-alumina tube, and a current collector. The current collector might be an outer cylindrical housing within which the electrolyte tube is located but, in the particular cell for which the electrode assembly of FIG. 4 is to be used, the electrode assembly lies within the electrolyte tube around an inner current collector rod. The mould of FIG. 2 is dimensioned so as to preform the electrode assembly exactly of a size such that it may be slipped in position in the cell with appropriate small clearances on its inner and outer faces. When the cell is brought into use and is heated to its operating temperature, typically 350° C., the sulphur in the preform melts and the matrix material will expand slightly so as to come in contact both with the electrolyte tube and with the current collector.

If it is required to strengthen the webs, a strengthening sheet material may be included within the mould. Materials which can be used for this purpose include cloths, felts, yarns, mats, strings or papers of fibrous carbon, graphite, alumina, silica, boron nitride or other materials chemically resistant to the cathodic reactant.

Figure 5:
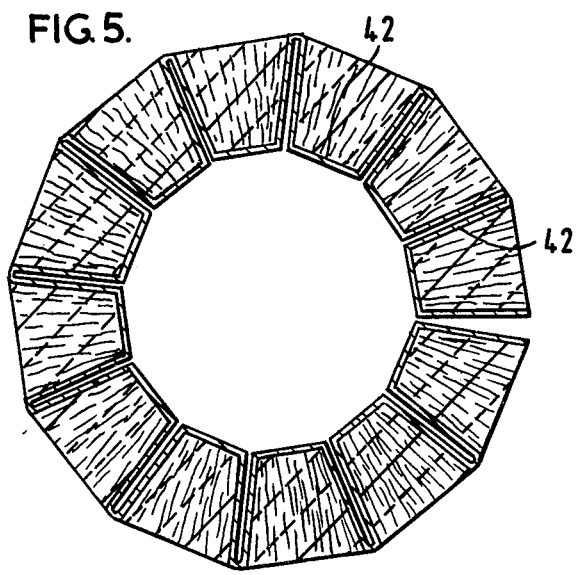
FIG. 5 is a diagram similar to FIG. 4 illustrating a modified form of the structure.

As shown in FIG. 3, it may sometimes be desirable to provide the prismatic segments such as segment 40 with a coating of a sheet material 41, e.g. a carbon fibre cloth of carbonised polymeric material, to form conductive fins between adjacent segments and over that face of the segment which is to lie in contact with the cathode current collector. For this purpose a pre-shaped sheet of the cloth may be applied over the individual segments. If the segments are joined by webs, such a sheet 42 of graphite foil may be put over the upper surface of an electrode assembly preform (e.g. the assembly of FIG. 3) so that, as shown in FIG. 5, the sheet 42 extends over each of the segments around the inner surface of the annular member and lies between the segments to define the fins of higher electronic conductivity. This cloth may be put into the mould so as to be impregnated with the cathodic reactant.

The matrix material put in the mould may comprise a composite formed of two or more different materials.

It will be seen that by the technique described above, an electrode assembly is formed which, because of the mould design, is accurately shaped. The electrode assemblies may be made with negligible wastage of matrix material in the construction of the preform. The matrix material is under a uniform radial compression. This radial compression can be kept quite small but, because of the arcuate dimensioning, even with the poor elasticity of the felt, the material can expand enough to contact the current collector and electrolyte when the cell is heated after assembly. The fibres however remain predominantly in radial planes in the cell.

Although, in the method described above, the sulphur is fed into the mould after the mould is closed to compress the matrix material, in some cases it may be preferred to impregnate the matrix material with the sulphur before putting it into the mould.

The following table shows the felt resistivity in directions perpendicular and parallel to the fibres for samples made of three different makes of graphite felts.

| SAMPLE NO. | RESISTIVITY PERPENDICULAR TO FIBERS | RESISTIVITY PARALLEL TO FIBERS |
| --- | --- | --- |
| 1 | 0.8 ohm cm | 0.3 ohm cm |
| 2 | 1.2 ohm cm | 0.1 ohm cm |
| 3 | 2.8 ohm cm | 0.3 ohm cm |

The use of preformed segments in the cathode assembly as described above facilitates the further improvement of the radial conductivity in the cathodic region by the provision of fins or the like extending between the segments. Such fins may be formed for example of graphite foil or of a suitable metal sheet or may be integral with or secured on the cathode current collector.

I claim:

1. In the manufacture of a sodium sulphur cell, a method of forming a cathodic electrode structure comprising the steps of forming a compressible block of electronically conductive fibrous material which is chemically resistant to a hot cathodic reactant containing sulphur/polysulphides, the fibres in the block predominantly extending parallel to a given plane in the block and being randomly oriented in said plane, cutting the block in a plurality of planes normal to said one plane to form at least one sheet in which substantially all of the fibres have a component of direction normal to the plane of the sheet, compressing the sheet in a direction normal to the plane of the sheet in a series of regions defined by parallel strips of the sheet surface to form a series of parallel grooves with sloping sides defining segments of trapezoidal section between the compressed regions with fibres lying normal to the parallel surfaces of the trapezoids between the compressed regions, impregnating the fibrous sheet, either before compression or during compression, with the cathodic reactant at a temperature such that the cathodic reactant is liquid, and cooling the impregnated shape to solidify the reactant.

2. In the manufacture of a sodium sulphur cell, a method of forming a cathodic electrode structure comprising the steps of forming a compressible block of electronically conductive fibrous material which is chemically resistant to a hot cathodic reactant containing sulphur/polysulphides, the fibres in the block predominantly extending in one direction, cutting the block in a plurality of planes normal to said one direction to form at least one sheet in which the fibres lie predominantly normal to the plane of the sheet, compressing the sheet in a direction normal to the plane of the sheet in a series of regions defined by parallel strips of the sheet surface at right angles to the direction of the fibres to form a series of parallel grooves with sloping sides defining segments of trapezoidal section between the compressed regions with the fibres lying predominantly normal to the parallel surfaces of the trapezoidal segments between the compressed regions, impregnating the fibrous sheet, either before compression or during compression, with the cathodic reactant at a temperature such that the cathodic reactant is liquid, and cooling the impregnated shape to solidify the reactant.

3. A method as claimed in either claim 1 or claim 2 wherein the compression to form the trapezoidal segments is effected by moulding in a heated ribbed mould.

4. A method as claimed in either claim 1 or claim 2 wherein the compression to form the trapezoidal segments is effected in a mould shaped so that the trapezoidal segments are joined by thin webs between the edges of adjacent trapezoidal segments and are dimensioned so that the trapezoidal segments can be formed into an annular assembly.

5. A method as claimed in either claim 1 or claim 2 wherein the fibre material is compressed in at least one direction normal to the direction of the fibres before being put in the mould.

* * * * *